W. AGER.
Rice Cleaner.
No. 26,331.
Patented Dec. 6, 1859.
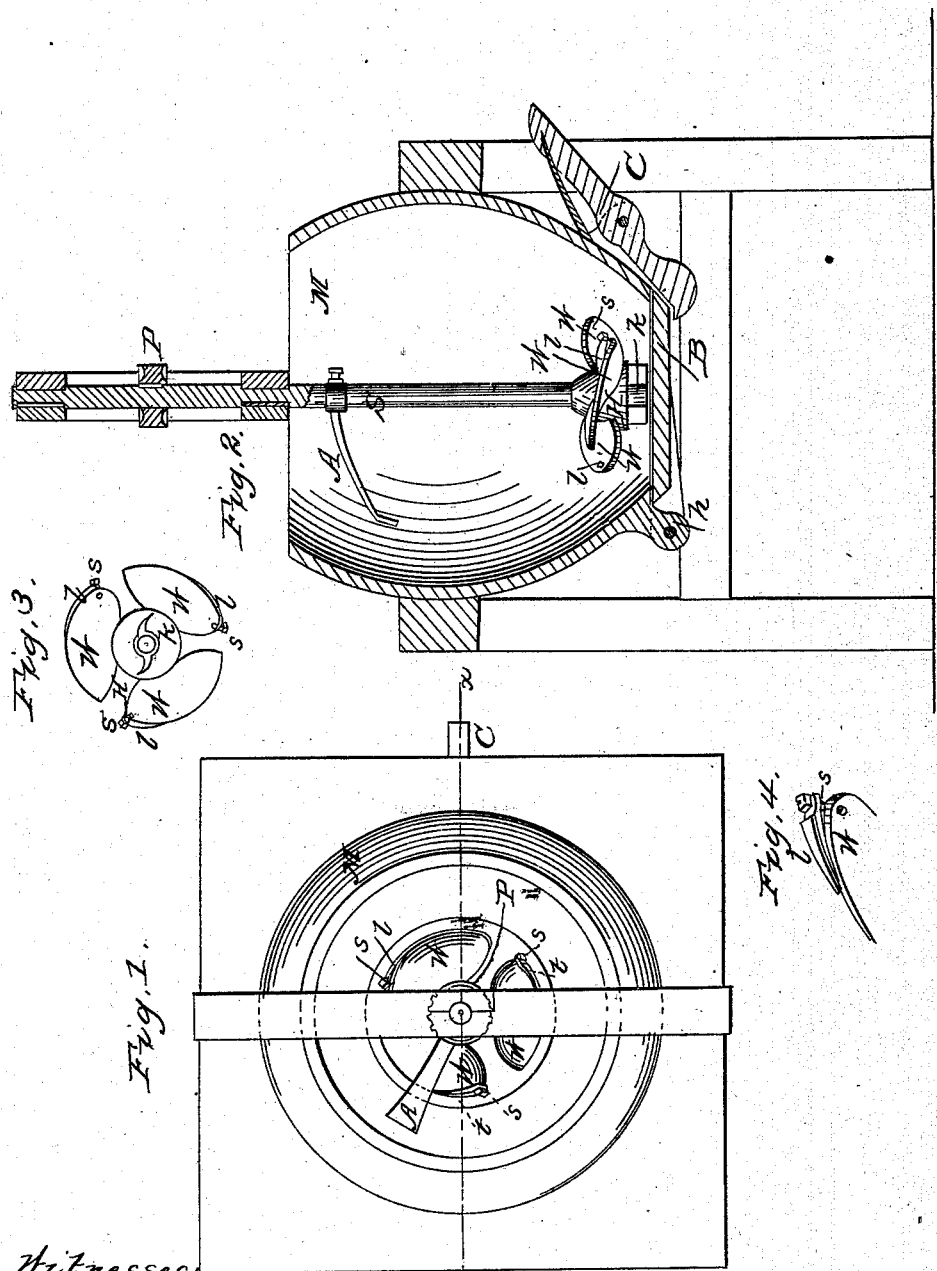

UNITED STATES PATENT OFFICE.

WILSON AGER, OF ROHRSBURG, PENNSYLVANIA, ASSIGNOR TO THOS. J. WOOLF AND P. J. JORDAN, OF PHILADELPHIA, PENNSYLVANIA.

MACHINE FOR CLEANING RICE.

Specification of Letters Patent No. 26,331, dated December 6, 1859.

*To all whom it may concern:*

Be it known that I, WILSON AGER, of Rohrsburg, in the county of Columbia and State of Pennsylvania, have invented a new and useful Improvement in Machines for Cleaning Rice; and I do hereby declare that the following is a full, clear, and exact description of the same, reference being had to the annexed drawing, forming part of this specification, in the several figures of which similar characters of reference denote the same part.

Figure 1, is a top view of my improved rice cleaner. Fig. 2, is a vertical section of the same on line *x*, *x*. Fig. 3, is a view of the bottom of the hub with the wings and cleaner attached. Fig. 4, is a view showing the attachment of the leaves to the wings.

The object of this invention is the removal of the inner pellicle from the grain, after separation from the husk, by means of pressure upon the body of the grain by oblique, rotating wings, the nature of the invention consisting in constructing the hub, to which the wings are attached, with a clearer beneath the same, so as to force the grain outward and prevent it from packing between the wings and the bottom of the mortar, a defect which exists in all other machines of this character.

The invention also consists in the attachment to the packing wings of adjustable leaves for the purpose of elevating the grain along the side of the mortar.

In the drawing M, is the mortar egg shaped, and curving upward toward its axis, having its bottom B, attached by hinge *h*, and secured in position by spring lever catch C, so as by a simple movement of the lever to allow the bottom to drop and discharge the contents of the mortar.

S, is the vertical shaft driven by power applied to pulley P, and having at its lower extremity a hub H, to which are attached a series of oblique wings W, whose tendency when the shaft S, is rotated in proper direction, is to force the grain against the bottom of the mortar. Under and attached to the hub is the clearer K, which consists of any desired number of radial arms either curved or straight running from the axis of the hub, or any other device equivalent thereto. Upon the upper edges of the wings are the leaves *l*, adjustable by screws, whose tendency is to force the grain in the direction opposite to that in which it is forced by the operating surface of the wings, or in other words to lift the grain upward along the side of the mortar. Attached to this shaft above the wings is the curved arm A, extending nearly to the side of the mortar, the object of which is to draw the grain from the sides of the mortar to the center thereof.

The operation of the machine is as follows: The action of the wings W, forces the grain against the bottom of the mortar and produces the friction necessary for effecting the cleaning, the clearer K, under the hub meantime forcing the grain outward before it has time to cake beneath the wings. The leaves *l*, adjusted to the amount of grain in the mortar, forces the grain upward along the side of the mortar, while the curved arm A, draws the upper portion of the grain toward the center and diminishes the weight of the grain to be raised, along the side of the mortar, so that there is a continued downward current of grain through the center to the wings and an upward current along the sides of the mortar. The clearer K, preventing the grain from remaining under the wings an undue length of time and being the prime mover of the upward current. In this manner the operation continues a sufficient length of time to remove the pellicle, when the grain is submitted to the ordinary brush for polishing.

Having thus described the construction and operation of my machine I claim—

1. Giving the grain a positive outward motion from under the pressing wings by the clearer K, or its equivalent, situated and operating substantially as set forth.

2. The adjustable leaves *l*, upon the wings for aiding the upward movement of the grain.

In testimony whereof I have hereunto signed my name before two subscribing witnesses.

WILSON AGER.

Witnesses:
ROBT. NETTLETON,
A. F. CUSHMAN.